A. OTTO, Jr.
HAY LOADER.
APPLICATION FILED MAR. 17, 1911.

999,585.

Patented Aug. 1, 1911.
4 SHEETS—SHEET 4.

Witnesses
J. Milton Jester
B. H. Kirkburne

Inventor
August Otto Jr.
By
C. L. Parker
Attorney

UNITED STATES PATENT OFFICE.

AUGUST OTTO, JR., OF SANDWICH, ILLINOIS.

HAY-LOADER.

999,585. Specification of Letters Patent. Patented Aug. 1, 1911.

Application filed March 17, 1911. Serial No. 615,175.

*To all whom it may concern:*

Be it known that I, AUGUST OTTO, Jr., a citizen of the United States, residing at Sandwich, in the county of Dekalb and State of Illinois, have invented certain new and useful Improvements in Hay-Loaders, of which the following is a specification.

My invention relates to hay loaders, which are adapted to be disposed at the rear of a wagon and attached thereto, so that as the wagon is driven along the field the hay is raked up and conveyed into the wagon.

An important object of this invention is to provide a device of the above character, which is automatic and positive in operation.

A further object of this invention is to provide a novel form of conveyer for conducting the hay after the same has been raked up, to the wagon.

A further object of this invention is to provide a novel form of draft appliance for connecting the hay loader to the wagon, so that said hay loader may have slight lateral movements and at the same time held in such a position that its raking means is disposed in its requisite position for gathering the hay.

A further object of this invention is to provide a novel form of reel for raking up the hay and delivering the same to the conveyer mechanism, such reel being so constructed that the teeth carried thereby are released to assume a substantially horizontal position when being withdrawn from the hay, whereby said teeth do not carry the hay with them in their rearward movement.

Other objects and advantages of this invention will be apparent during the course of the following description.

Figure 1:
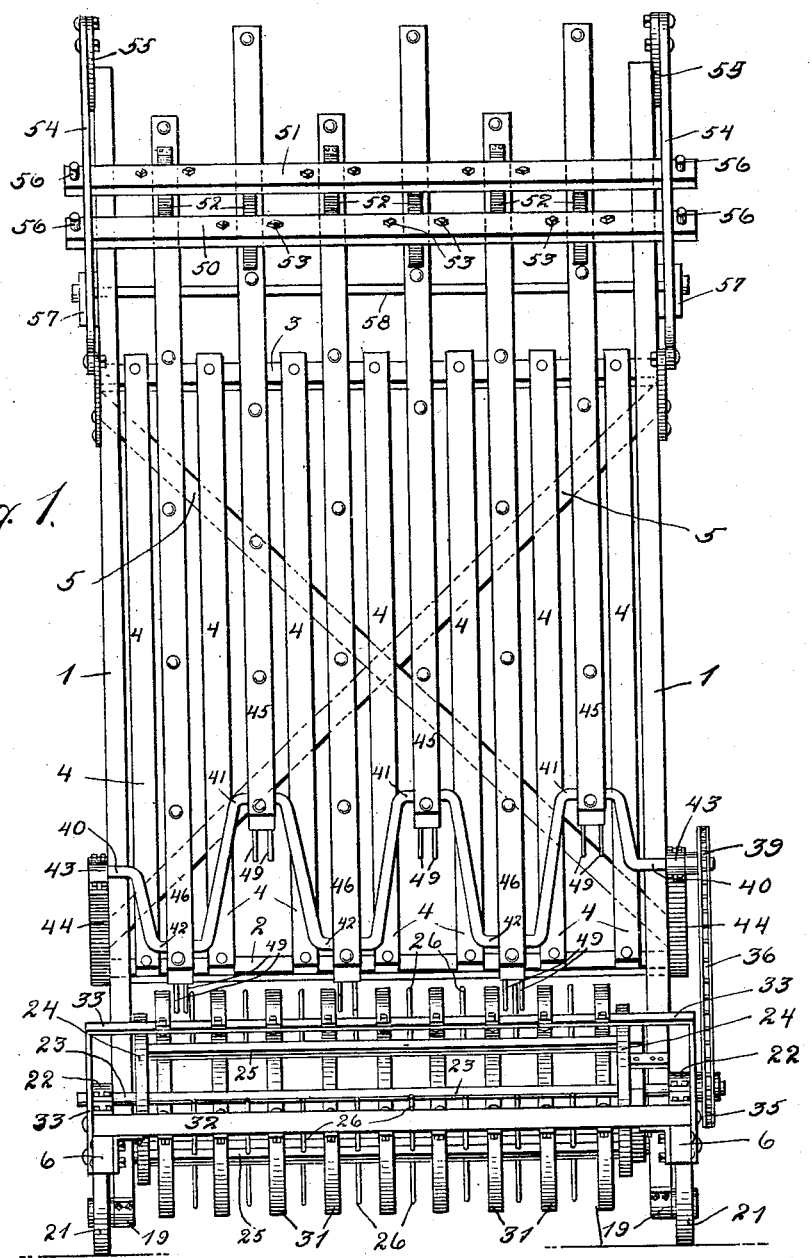
Figure 2:
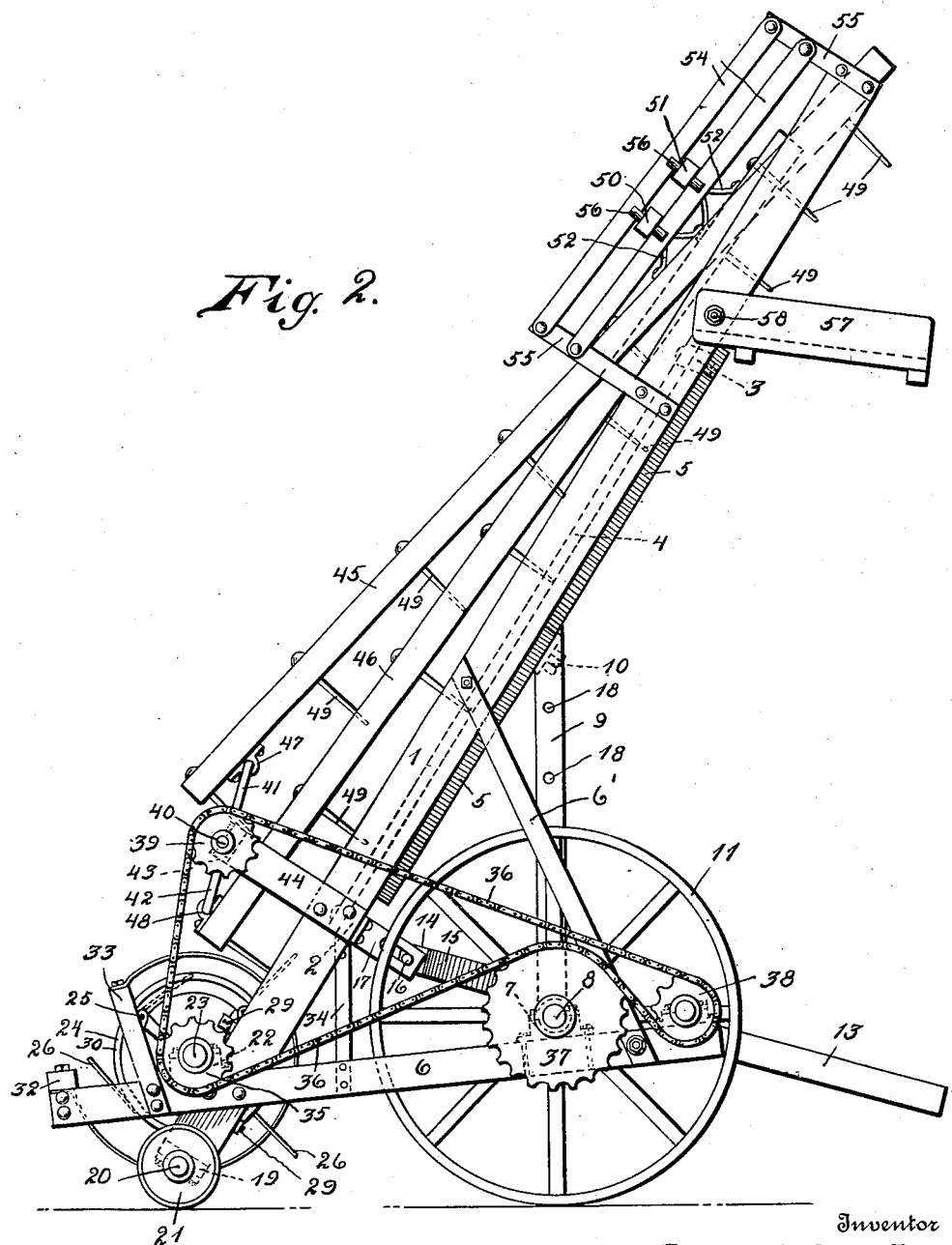
Figure 3:
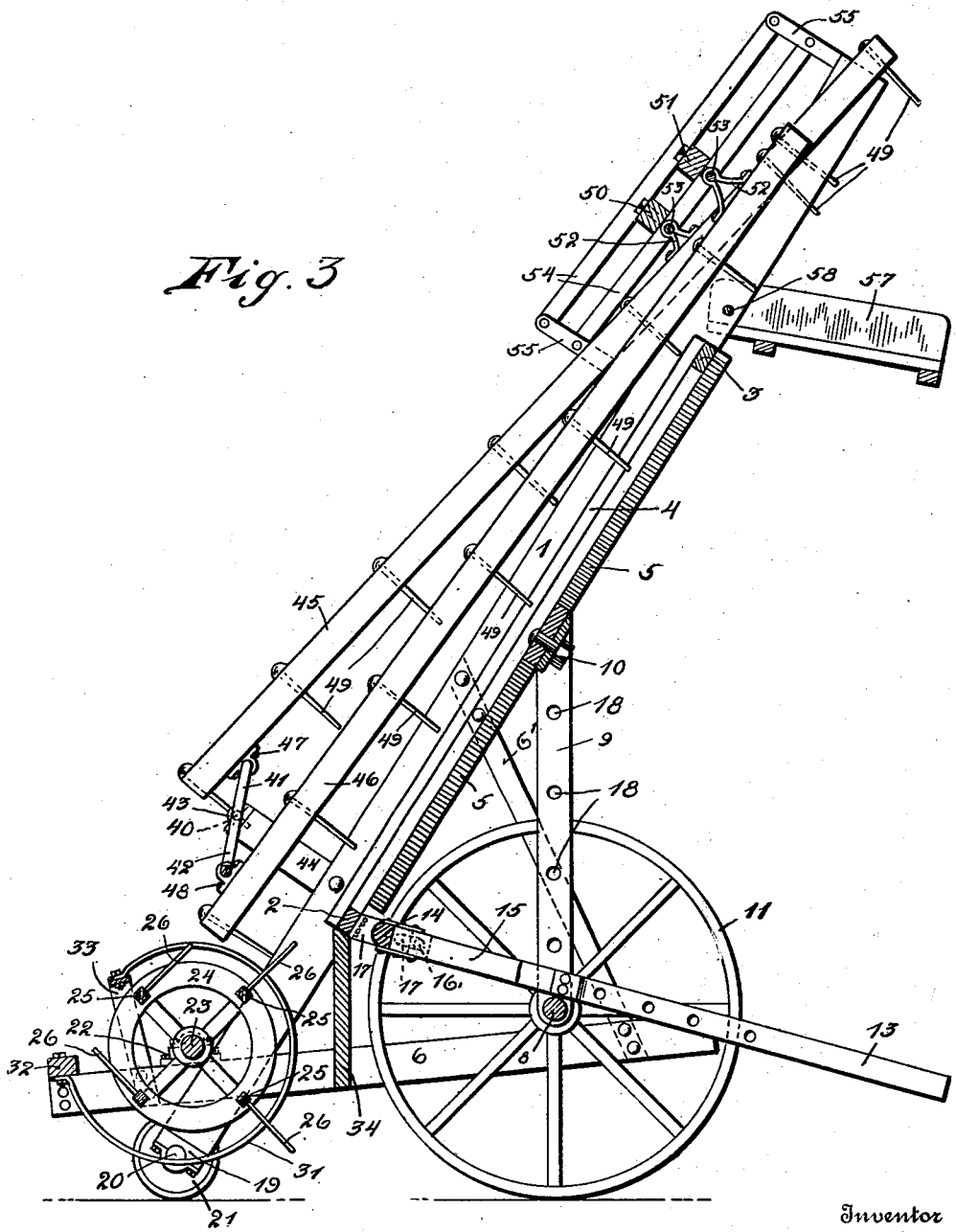
Figure 4:
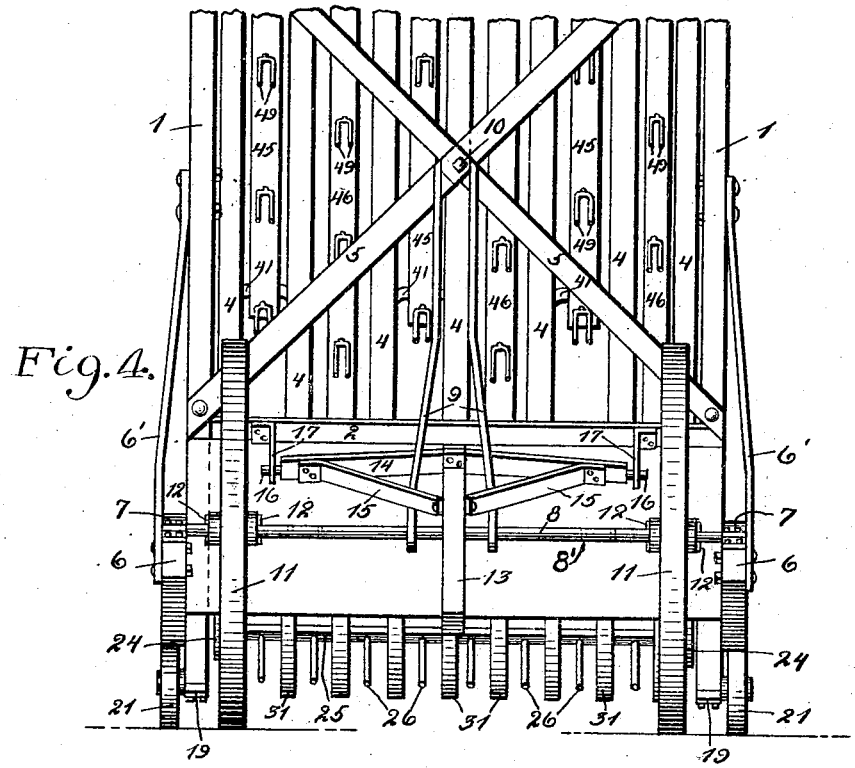
Figure 5:
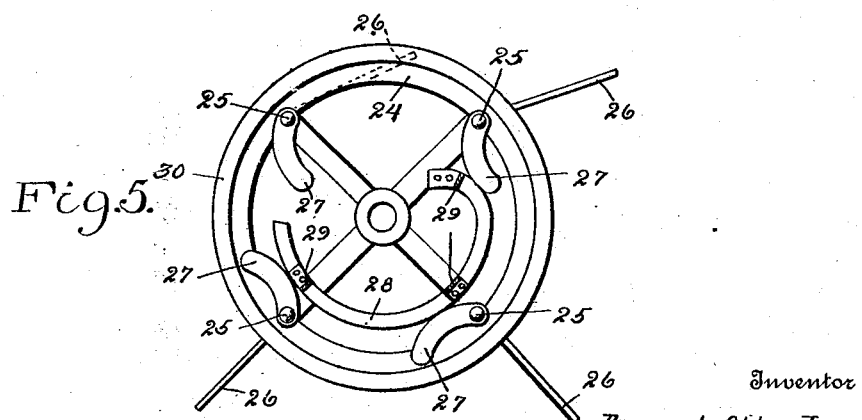

In the accompanying drawings forming a part of this specification, and in which like numerals are employed to designate like parts throughout the same, Figure 1 is a front view of my improved hay loader, Fig. 2 is a side view of the same, Fig. 3 is a central vertical sectional view taken through the same, Fig. 4 is a rear view of the device, the upper portion thereof being broken away, and, Fig. 5 is an end view of the reel structure.

In the drawing wherein is illustrated a preferred embodiment of my invention, a hay loader is shown comprising a normally inclined preferably rectangular frame including longitudinal beams 1, which are connected near their opposite ends by transverse strips 2 and 3. Secured to these transverse strips are suitably spaced slats 4, serving as a bottom for the frame. Disposed upon the outer side of the transverse strips 2 and 3 are diagonal strips 5, rigidly connected with the longitudinal beams and crossing each other, as shown. Rigidly connected with the lower portion of the longitudinal beams 1 are substantially horizontal beams 6, carrying near their forward ends journal boxes 7, which receive an axle 8. A pair of spaced depending bars 9 is connected with the diagonal strips 5 at their point of intersection, by a bolt 10, said bars being formed of a single section of metal bent upon itself midway its ends and shaped to form a head having an opening therein for receiving the bolt 10. The spaced bars 9 are spread apart near their lower ends and such lower ends are provided with openings formed therethrough for receiving the axle 8. Rotatably mounted upon the axle 8 inwardly of the beams 6, are wheels 11, which are normally prevented from moving inwardly and longitudinally of the axle 8 by transverse pins 12 or other suitable means. The axle 8 is provided inwardly of the beams 6 with transverse openings 8' formed therethrough, whereby after the wheels 11 have been moved a desired distance inwardly toward each other, pairs of the pins 12 may be positioned upon opposite sides of said wheels to prevent the same from moving longitudinally of the axle.

I provide a novel form of draft appliance for my hay loader, the same comprising a tongue 13, having one end thereof rigidly connected with a bowed transverse bar 14, at a point midway the ends of said bar, as clearly illustrated in Fig. 4. The tongue is further connected with the bar 14 by means of diagonal braces 15. The outer ends of the bar 14 are provided with trunnions 16, which operate within elongated slots formed through brackets 17, which are rigidly connected with the lower transverse strip 2. The tongue 13 extends between the spaced bars 9 and is adapted to have slight lateral movement therebetween and to be raised and lowered in a vertical plane. The bars 9 are provided with spaced openings 18, for receiving pins (not shown), by the employment of which the tongue may be locked in adjustment at different angles, with relation to its vertical movement.

The lower ends of the longitudinal beams 1 are provided with journal boxes 19 which hold stud shafts 20, upon which are mounted wheels 21. The beams 6 are provided at points near and spaced from their rear ends with journal boxes 22, for holding a transverse shaft 23, included in a reel structure to be next described. This reel structure comprises a pair of wheels 24, which are rigidly mounted upon the shaft 23. Disposed between the wheels 24 and near the peripheries thereof are rods 25, which are pivotally connected with said wheels and carry spaced teeth 26. As shown in Fig. 5, each of the rods 25 has a cylindrical end portion journaled in and extending through the wheel 24, to which end portion is rigidly connected a curved weight 27. Disposed for coöperation with the curved weights 27 is a relatively stationary cam-track 28, being rigidly connected with one of the longitudinal beams 1 by means of straps 29, or the like. The wheel 24 is also provided with an annular flange 30, which surrounds the curved weights 27, as shown. Disposed in proximity to and partly surrounding the reel, are curved stationary strips 31, spaced so that the teeth 26 may operate therebetween and extend beyond the same. The rear ends of these curved strips are suitably connected with a transverse beam 32, which is mounted upon the rear end of the beams 6. The opposite ends of the curved strips 31 are connected for support with the horizontal portion of an inverted U-shaped strip 33, having its ends rigidly connected with the beams 6, as shown. Disposed forwardly of the curved strips 31 is an apron 34, which is connected with the beams 6 and the lower transverse strip 2. The shaft 23 receives its rotation from a sprocket-wheel 35, which is driven by a sprocket-chain 36, extending forwardly to engage a sprocket-wheel 37, which is rigidly mounted upon the axle 8. This sprocket-chain is trained about a sprocket-wheel 38, which is rotatably mounted upon the beam 6 forwardly of the sprocket-wheel 37. The sprocket-chain 36 is further trained about a sprocket-wheel 39 which is disposed above and spaced from the sprocket-wheel 35.

A conveyer mechanism is provided to receive and elevate the hay which is raked up by the reel structure, such mechanism comprising a transverse shaft 40 provided with two sets of crank-portions 41 and 42. The shaft 40 is held by journal boxes 43, which are mounted upon supports 44, having rigid connection with the longitudinal beams 1. The sprocket-wheel 39 is rigidly connected with the shaft 40. The conveyer mechanism further comprises two sets of longitudinally movable beams 45 and 46, provided respectively near their lower ends with journal boxes 47 and 48, for receiving the crank portion 41 and 42. The beams 45 and 46 are provided at spaced intervals with downwardly extending pins or teeth 49, as shown. The sets of longitudinal movable beams 45 and 46 have their forward end portions pivotally connected to movable transverse bars 50 and 51, by means of brackets 52, which engage eye bolts 53. The transverse bars are slidably mounted within guide-ways, comprising spaced longitudinal strips 54, supported by standards 55, which are rigidly connected with beams 1. The transverse bars 50 and 51 are prevented from having movements transversely of the frame of the machine, by virtue of transverse pins 56 extending through the ends thereof. I further provide a discharge chute 57, the side pieces of which are disposed outwardly of the beams 1 and are pivotally connected therewith by a pin 58.

In the operation of the hay loader the same is placed in the rear of a wagon and the tongue 13 is locked in its lowermost position and then secured to the wagon. The chute 57 is disposed to discharge into the wagon. The pull on the tongue 13 tends to oscillate the longitudinal beams 1 downwardly to exert pressure on the wheels 21, whereby the reel structure is retained in its requisite position with relation to the hay. The movement of the sprocket-wheel 37 is imparted to the shaft 23 which is rotated counter-clockwise, so that the teeth of the reel structure rake up the straw and force the same past the apron 34 and into engagement with the teeth 49 carried by the beams 45 and 46. As shown in Fig. 5, the cam-track 28 holds the curved weights 27 when they are disposed below the same, against movement in one direction and the flange 30 prevents the oscillation of the weights in a reverse direction, whereby the teeth 26 can not oscillate with relation to the wheels 24. As each successive curved weight 27 is carried upwardly and clears the upper end of the cam-track 28, such weight assumes a vertical position so that the teeth connected therewith are substantially horizontally disposed and may be withdrawn from the straw without carrying any of the straw with them. As the weight 27 now travels rearwardly its free curved end engages the end of the cam-track 28 whereby such weight is tripped and the teeth 26 will again extend outwardly beyond the heads 24. The cam-track 28 will then hold the weight 27 against movement, as above described. The curved strips 31, coöperate with the teeth 26 to prevent such teeth from carrying the straw with them upon their rearward movement, or in other words these strips scrape the straw from said teeth. The straw delivered to the lower end of the beams 45 and 46 is elevated by such beams, the lower end of each of said beams traveling downwardly when the beam is moving upwardly and said lower end traveling upwardly out of engagement with the straw when said beam is moved rearwardly. The sets of beams 45 and 46 operate alternately, that is one set is moving longitudinally and upwardly while the other set is moving longitudinally and downwardly in a reverse direction. Owing to the structure of the draft appliance, the hay loader may have slight lateral movements with relation thereto, which is often caused by irregularity in the ground over which the same travels.

I wish it understood that the form of my invention herewith shown and described is to be taken as a preferred example of the same and that certain changes in the shape, size, and arrangement of parts may be resorted to without departing from the spirit of my invention or the scope of the subjoined claims.

Having thus described my invention, I claim:—

1. In a machine of the character described, a lower approximately horizontally disposed frame, traction wheels for supporting the same, a sprocket wheel adapted to be driven by the traction wheels, a second sprocket wheel mounted upon said lower frame and forwardly of the first named sprocket wheel, a third sprocket wheel mounted upon said lower frame rearwardly of the first named sprocket wheel, a reel structure operated by the third sprocket wheel, an inclined supporting structure mounted upon the lower frame, a fourth sprocket wheel connected with a crank shaft which is suitably mounted upon the inclined supporting structure, a sprocket chain engaging all four of the sprocket wheels, longitudinally movable teeth-carrying beams having pivotal connection with the crank shaft, transverse bars connected with the upper ends of the teeth-carrying beams, and spaced bars serving as tracks to guide said transverse bars in their movements.

2. In a machine of the character described, a lower approximately horizontal frame, traction wheels for supporting the forward end thereof, an upstanding inclined frame connected with the lower frame and including longitudinal beams extending below the lower frame, wheels connected with the lower ends of the longitudinal beams, longitudinally movable teeth-carrying beams disposed above and adapted to operate within the upstanding inclined frame, a crank shaft suitably mounted upon the lower end of the upstanding inclined frame and having pivotal connection with the longitudinally movable teeth-carrying beams, transverse bars connected with the teeth-carrying beams, guide-ways connected with the upstanding inclined frame and having slidable engagement with the transverse bars, a reel structure suitably mounted upon the longitudinal beams and disposed to operate between the second named wheels and the teeth-carrying beams, and common driving connecting means between the traction wheels and the reel structure and crank shaft.

In testimony whereof I affix my signature in presence of two witnesses.

AUGUST OTTO, Jr.

Witnesses:
J. P. SEDGWICK,
J. E. WHITE.